US009095207B2

(12) United States Patent
Schindler (10) Patent No.: US 9,095,207 B2
(45) Date of Patent: Aug. 4, 2015

(54) ADJUSTABLE TRAY ASSEMBLY FOR A FIXTURE, SUCH AS A TRIPOD OR OTHER MULTI-LEGGED DEVICE

(71) Applicant: Daniel J. Schindler, Novelty, OH (US)

(72) Inventor: Daniel J. Schindler, Novelty, OH (US)

( * ) Notice: Subject to any disclaimer, the term of this patent is extended or adjusted under 35 U.S.C. 154(b) by 0 days.

(21) Appl. No.: 14/035,043

(22) Filed: Sep. 24, 2013

(65) Prior Publication Data

US 2014/0144351 A1 May 29, 2014

Related U.S. Application Data

(60) Provisional application No. 61/730,308, filed on Nov. 27, 2012.

(51) Int. Cl.
*A47B 5/00* (2006.01)
*A47B 5/02* (2006.01)
*A47G 23/06* (2006.01)
*F16M 13/02* (2006.01)

(52) U.S. Cl.
CPC . *A47B 5/02* (2013.01); *A47G 23/06* (2013.01); *F16M 13/02* (2013.01)

(58) Field of Classification Search
CPC ............ A47B 5/02; A47B 5/06; A47B 23/02; A47B 97/04; F16M 11/13; F16M 11/32
USPC ................... 108/50.11, 11, 12, 42, 151, 152; 248/150, 151, 152, 174
See application file for complete search history.

(56) References Cited

U.S. PATENT DOCUMENTS

| 2,984,443 | A |  | 5/1961 | Bergengren | |
|---|---|---|---|---|---|
| 3,465,893 | A | * | 9/1969 | Kinney | 211/86.01 |
| 4,187,787 | A | * | 2/1980 | Nakatsu | 108/96 |
| 4,244,301 | A | * | 1/1981 | Nakatsu | 108/149 |
| 4,688,541 | A | * | 8/1987 | Stephen et al. | 126/25 R |
| 4,730,700 | A | * | 3/1988 | Miller et al. | 182/187 |
| 5,052,648 | A | * | 10/1991 | Landau | 248/235 |
| 5,427,344 | A | * | 6/1995 | Beauchemin | 248/218.4 |
| 5,918,550 | A | * | 7/1999 | Weir et al. | 108/42 |
| 6,116,164 | A | * | 9/2000 | Justen, Jr. | 108/42 |
| 6,119,615 | A | * | 9/2000 | Porat | 114/85 |
| 6,224,029 | B1 | * | 5/2001 | Marble et al. | 248/214 |
| 6,240,857 | B1 | * | 6/2001 | Elizer | 108/152 |
| 6,443,407 | B1 | * | 9/2002 | Ibrahim | 248/163.2 |
| 6,814,418 | B2 | * | 11/2004 | D'Orso | 312/351 |
| 7,513,470 | B2 |  | 4/2009 | Lomberk | |
| 7,950,335 | B1 | * | 5/2011 | Almond et al. | 108/42 |
| 2008/0053344 | A1 | * | 3/2008 | Almond | 108/152 |
| 2012/0079964 | A1 | * | 4/2012 | Gentry et al. | 108/42 |
| 2012/0079965 | A1 | * | 4/2012 | Gentry et al. | 108/42 |

* cited by examiner

*Primary Examiner* — Daniel Rohrhoff
(74) *Attorney, Agent, or Firm* — Hudak, Shunk & Farine Co. LPA (57) ABSTRACT

A tray assembly adapted to be removably connected to a fixture, e.g. a tripod, ladder, chair, a rigid fixture or other single or multi-legged device, the assembly including a tray adapted to support objects, a securing mechanism for operatively attaching the tray to the fixture and optionally a support leg for maintaining the tray at a desired position in relation to the fixture. Methods for securing a tray assembly to a fixture and using the assembly are disclosed.

18 Claims, 7 Drawing Sheets

ADJUSTABLE TRAY ASSEMBLY FOR A FIXTURE, SUCH AS A TRIPOD OR OTHER MULTI-LEGGED DEVICE

CROSS REFERENCE

This application claims the benefit of priority under 35 U.S.C. §119 of U.S. Provisional Application Ser. No. 61/730,308, filed on Nov. 27, 2012, herein fully incorporated by reference.

FIELD OF THE INVENTION

The present invention relates to a tray assembly adapted to be removably connected to a fixture, e.g. a tripod, ladder, chair, tree, a rigid fixture or other single or multi-legged device, the assembly including a tray adapted to support objects, with or without side walls, a securing mechanism for operatively attaching the tray to the fixture and optionally a support leg for maintaining the tray at a desired position in relation to the fixture. Methods for securing a tray assembly to a fixture and using the assembly are disclosed.

BACKGROUND OF THE INVENTION

Tables and trays normally rely upon their own supporting leg, or in some embodiments are set upon a table in the case of a tray, whereas this invention relies primarily on the support of a rigid fixture, such as a tripod, chair, cabinet drawer, etc. Tripods and tripod-like devices such as surveying devices, telescopes, and easels are long known and used in many different applications. For example, tripods have been used to support cameras, video equipment, telescopes, and artist's mediums such as canvases. For many applications, it would be desirable to provide the tripod with a tray to support accessories, tools, documents, computers, tablets, electronics, painting equipment, surveying tools, note pads, other accessories applicable to the primary use or the like.

Various trays have been proposed for use in conjunction with fixtures, e.g. tripods.

U.S. Pat. No. 2,984,443 relates to a holder for an artist's palette and has for one of its objects the provision of means for reportedly securely supporting such palette on an artist's easel in a position on the latter where it is most convenient to the artist and accessible to the artist when a canvas or board for a painting is also supported on said easel.

U.S. Pat. No. 6,240,857 relates to a removable shelf assembly for use with a tripod or easel having three legs, including a shelf with at least two boot-shaped cutouts formed in the back edge of the shelf and a pair of support arms, that provides a work and storage surface for the tripod or easel user. The removable shelf assembly mounts onto the tripod by attaching the shelf to two of the tripod legs at the cutouts, and attaching the support arms to the same two tripod legs with clamps pivotally mounted at the ends of the support arms. Hooks and holders are also optionally provided with the shelf to facilitate convenient placement of tools and materials adjacent to the shelf.

U.S. Pat. No. 6,443,407 relates to accessory trays supported between the legs of a camera tripod. In a first embodiment, a semicircular tray having side walls is supported on the stabilizing arms or the end cap of a camera tripod and is attached to the lower portion of the center post by a retaining device. In a second embodiment, two semicircular trays are supported on the stabilizing arms of a camera tripod and surround the center post. In the second embodiment, each semicircular portion has a recess into which the center post fits. In this second embodiment, the semicircular portions are attached to each other in a variety of ways.

U.S. Patent Application Publication No. 2008/0053344 relates to a removable tray assembly for use with a tripod or easel. The tray assembly includes a shelf having a back edge, a front edge, and two side edges. The tray assembly also includes a pair of support tabs spaced from the back edge of the shelf by respective slots. The removable tray is attached to two legs of the tripod, with one leg passing through each slot. The support tabs contact the side of the tripod legs opposite the shelf and thereby support the shelf in a cantilever fashion.

U.S. Pat. No. 7,513,470 relates to a personal computer, video monitor or other electronic equipment mounted directly on a camera tripod by a tray offering a cantilever technique of support by having a rear end supported by two clamps individually positioned at the same height on two of the tripod legs, and a front end locked by a third clamp at a higher elevation on the remaining leg of the tripod.

Even in view of the trays proposed in the art, there is still a need for an adjustable, durable, portable, reliable and stable tray assembly, which is infinitely adjustable in height and angle, foldable, and solely self-contained requiring no accessory parts to secure.

SUMMARY OF THE INVENTION

In view of the above, it would be desirable to provide a tray assembly including one or more of the needed features. It is an object of the present invention to provide a tray assembly having a securing mechanism that allows the tray to be secured to a fixture or tripod at a plurality of different vertical heights thereby allowing the user to select a comfortable or necessary working distance in relation to an upper surface of the tray.

Yet another object is to provide a tray assembly having a tray comprising a major tray plane that can be secured to a fixture such as a tripod at a plurality of different angles with respect to a vertical plane.

Yet another object is to provide a tray assembly with a securing mechanism having a length-adjustable attachment element, such as a cord in order to provide at least a minimum amount of tension to maintain the tray in a desired position.

A further object is to provide a securing mechanism with a plurality of different connector segments for two mounting points for example two tripod legs, such as slots formed in the tray to allow multiple connection points at different vertical heights on a tripod.

Still another object is to provide a securing mechanism comprising a high-friction, yet conformable and resilient connector segment that is adapted to mold about a leg of the fixture or an area of a fixture to which the tray is operatively connected to aid in securing the tray assembly to the tripod.

An additional object is to provide the tray assembly with a support leg for bracing the tray at a desired position, with the support leg having one or more of an adjustable length and an adjustable angle, to provide versatility to the tray assembly.

Yet another object is to provide a support leg, that in addition to contacting the tray, contacts one or more of a ground surface and a leg of the fixture not in contact with the tray.

Other objects of the present invention include providing the tray with an aperture at a distal end located away from the tripod, and a support leg with a projection extendable through the aperture in order to provide the tray with an additional brace, if desired.

A further object of the present invention is to provide a construction wherein the attachment element is wrapped around a leg of the fixture at least one full rotation which provides a protrusion, one of the benefits of allowing the attachment element to self-tighten due to supporting at least some of the weight of the tray and also provide a seat for a portion of the tray.

Still another object is to provide the tray assembly with an additional attachment element which is connected to the fixture or tripod at a location above the tray and a portion of the attachment element extends through an aperture in the tray at a location relatively close to and between the front legs of the tripod, the attachment element extended around a portion of the support leg to provide support thereto.

An additional object of the present invention is to provide the tray with an upper surface that is magnetic and a tray accessory that is also magnetic and is adapted to form a magnetic bond with the tray. In other embodiments the tray accessory, such as a document holder or shelf or the like is provided with its own attachment element that is connectable to the tray at a desired location.

Accordingly, in one aspect of the invention a tray assembly for a device comprising a tripod is disclosed, comprising a single or multi-legged device, or a rigid structure, the tray assembly comprising a tray having an upper surface, a lower surface, a back side, a front side, and two ends a securing mechanism including first and second attachment elements each comprising an adjustable length cord; and wherein the tray includes one or more of a) a plurality of pockets adapted to accept a leg of the device and b) a conformable fitting adapted to accommodate a leg of the device, wherein the tray further includes one or more of i) an aperture and ii) a notch for each securing mechanism present, and wherein the first and second attachment elements are adapted for operatively connecting the tray to the tripod, multi-legged device, or a rigid structure whereby the tray is supported thereby.

In another aspect of the invention a tray assembly that can be secured to a device is disclosed comprising a single leg, tripod, multi-legged device or a rigid structure at a plurality of different vertical heights, the tray assembly comprising a tray comprising a major tray plane having an upper surface and a lower surface, the tray plane bounded by a back side, a front side and two ends, wherein the tray can be secured to the device such that the major tray plane is located at a plurality of different angles with respect to a vertical plane a securing mechanism having a length-adjustable attachment element for providing at least a minimum amount of tension to maintain the tray in a desired position in relation to the device, wherein the securing mechanism is connected to the tray at two different locations and also adapted to contact the device.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

This description of useful embodiments is to be read in connection with the accompanying drawings, which are part of the entire written description of this invention. In the description, corresponding reference numbers are used throughout to identify the same or functionally similar elements. Relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The tray assembly of the present invention provides an easily attachable and removable, versatile, and transportable device for a fixture, such as but not limited to a tripod, other multi-legged device or rigid structure. The assembly includes a tray with a work surface, generally an upper surface, suitable for many uses, including, but not limited to a support for items to be photographed, recorded, or the like. Many different objects can be placed on the tray. Due to the unique structure of the tray assembly, the tray thereof can be located at a plurality of different vertical heights in relation to the fixture or tripod which is adapted to be operatively connected thereto. Additionally, the tray assembly is relatively simple to connect to the fixture or tripod, and requires no additional tools for set up, and can be easily taken down or removed from the fixture or tripod after use. The structure of the tray assembly provides sufficient support for the tray while being light in weight.

Figure 1:
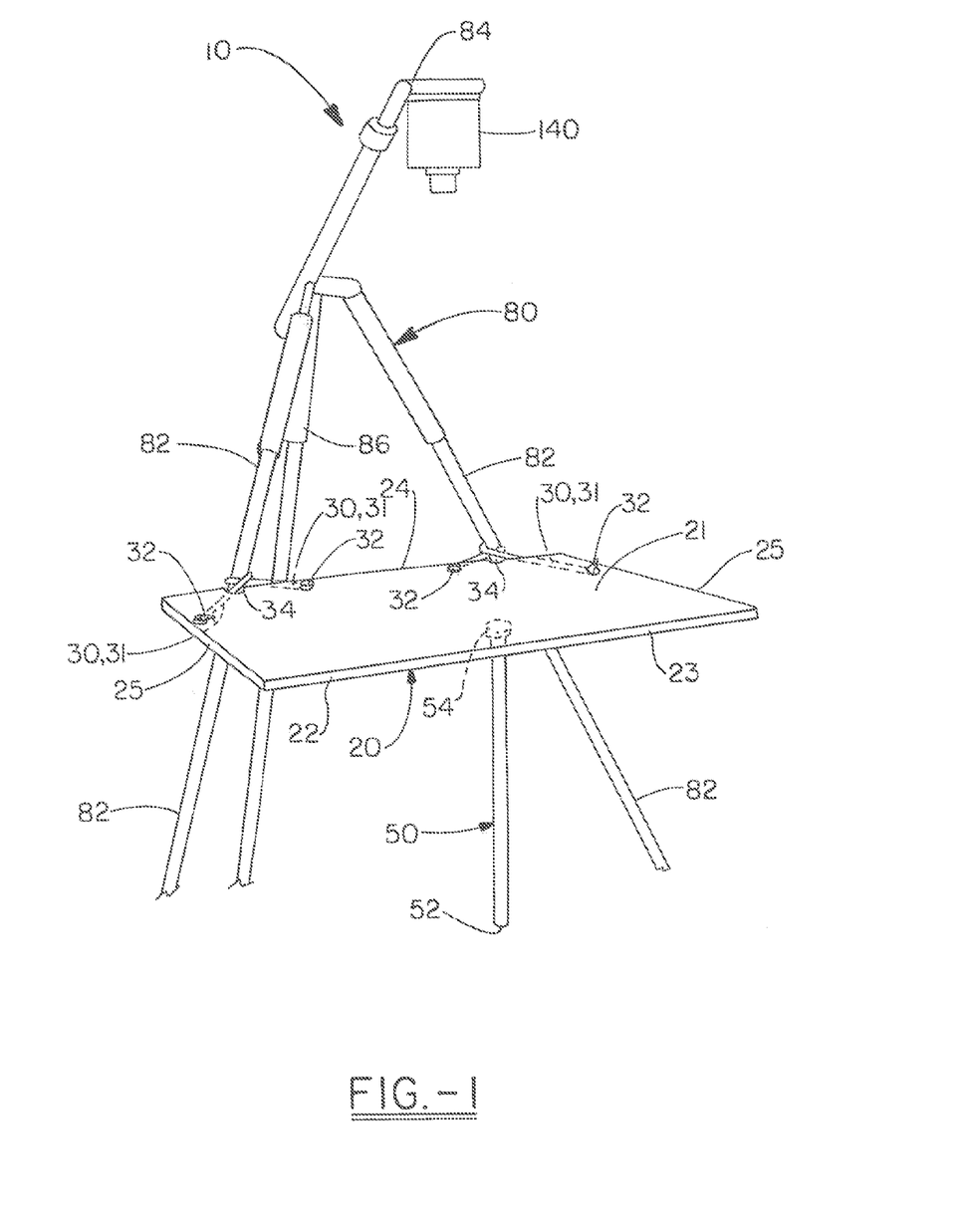
FIG. 1 is a perspective view of one embodiment of a tray assembly of the present invention connected to a tripod.
Figure 2:
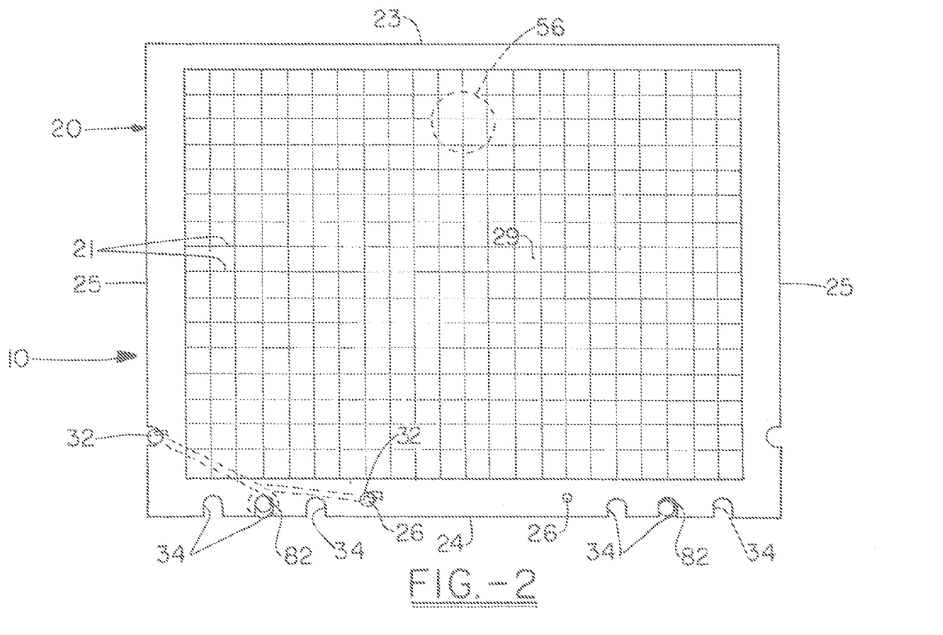
FIG. 2 is a top view of an embodiment of a tray assembly illustrated in FIG. 1.
Figure 3:
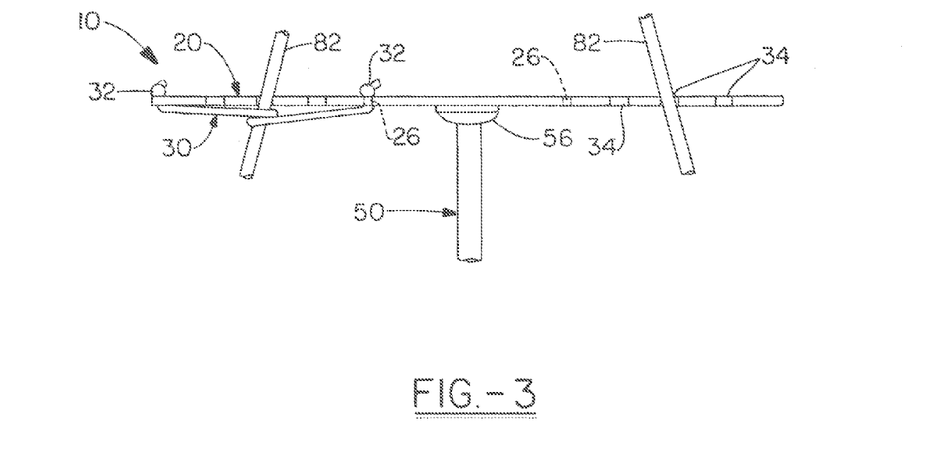
FIG. 3 is a front elevational view of the embodiment illustrated in FIG. 1.

Referring now to the drawings, FIGS. 1-3 illustrate one embodiment of a tray assembly 10 including a tray 20 operatively connected to a tripod 80 by a securing mechanism 30. The tray is bolstered by a support leg 50. Obviously the tripod has three legs 82, and it is to be understood that the assembly 10 can be used with substantially any fixture such as a "multi-pod" having two or more legs or a rigid structure essentially having a single leg in some embodiments. The term "tripod" is used herein and can be replaced with any said fixture, e.g., multi-pod or other rigid structure device for which a tray having work surface or other surface would be suitable. Tripods are often called by other names, generally depending on end use applications, for example, but not limited to easels such as painter's easels, artist's easels, display easels, camera tripods, telescope tripods, surveyor tripods and videographer tripods, tables, chairs, a tree, or any supportive fixture.

The tray assembly 10 of the present invention is versatile and can be produced having a multitude of configurations. In an "in use" position, see FIG. 1 for example, the tray 20 is constructed to provide a strong, stable support for one or more objects to be placed thereon. In one embodiment the tray includes an upper surface 21 upon which objects can be placed, a lower surface 22, a front side 23 and a back side 24. Additional sides or ends 25 are located adjacent the front side 23 and back side 24. In one embodiment, the tray is foldable and can include hinges, perforated segments, fold lines or the like so the tray can be compactly transported or stored when not in use.

The dimensions of the tray can vary depending on the application. The tray should at least have a large enough surface area to hold one or more desired objects, but not be too large to conveniently store and/or transport to different locations. That said, the length and width dimensions of the tray can vary depending upon desired end use. The thickness of the tray also depends on desired end use applications. The type of material utilized and the thickness of the material can vary depending upon the expected load to be supported by the tray. That said, the tray thickness can be variable along any portion thereof and can include reinforcing elements such as ribs or the like.

The tray can be formed generally from any desired materials such as a polymer, natural material such as wood, or metal or the like. In one embodiment the tray is formed from a polymeric material such as a polyolefin, polyvinyl chloride or the like. In one embodiment, the tray comprises moderately expanded closed-cell polyvinyl chloride, such as Sintra® board available from Laird Plastics. Still other trays can be formed from foam core board or composite metal boards having a metallic, magnetically attractable surface, if desired. The polymer can be foamed or not. In a further embodiment, the tray is formed from cardboard, preferably corrugated cardboard in one embodiment. It is to be understood that while the tray is shown in FIG. 1 is rectangular, the tray can have any general shape desired by the end user, such as square, circular, oval, or the like.

Any surface, that is, one or more surfaces of the tray, such as the upper surface 21, work surface or main surface, can be provided with any number of suitable finishes or coatings, such as but not limited to, dry erase coatings, non-skid coatings, green board or the like.

In a further embodiment of the invention, the tray has an upper surface, or any other desired surface that is provided with indicia 29. Indicia includes, but is not limited to signage, placement aids, grids, and measurement increments. For example, when photographing or video recording objects, such as in the asset archiving field, it is desired, if not mandatory in some instances to record the size or scale of an object and providing measurement scales is a means for accomplishing the requirement.

Figures 6, 7, 8:
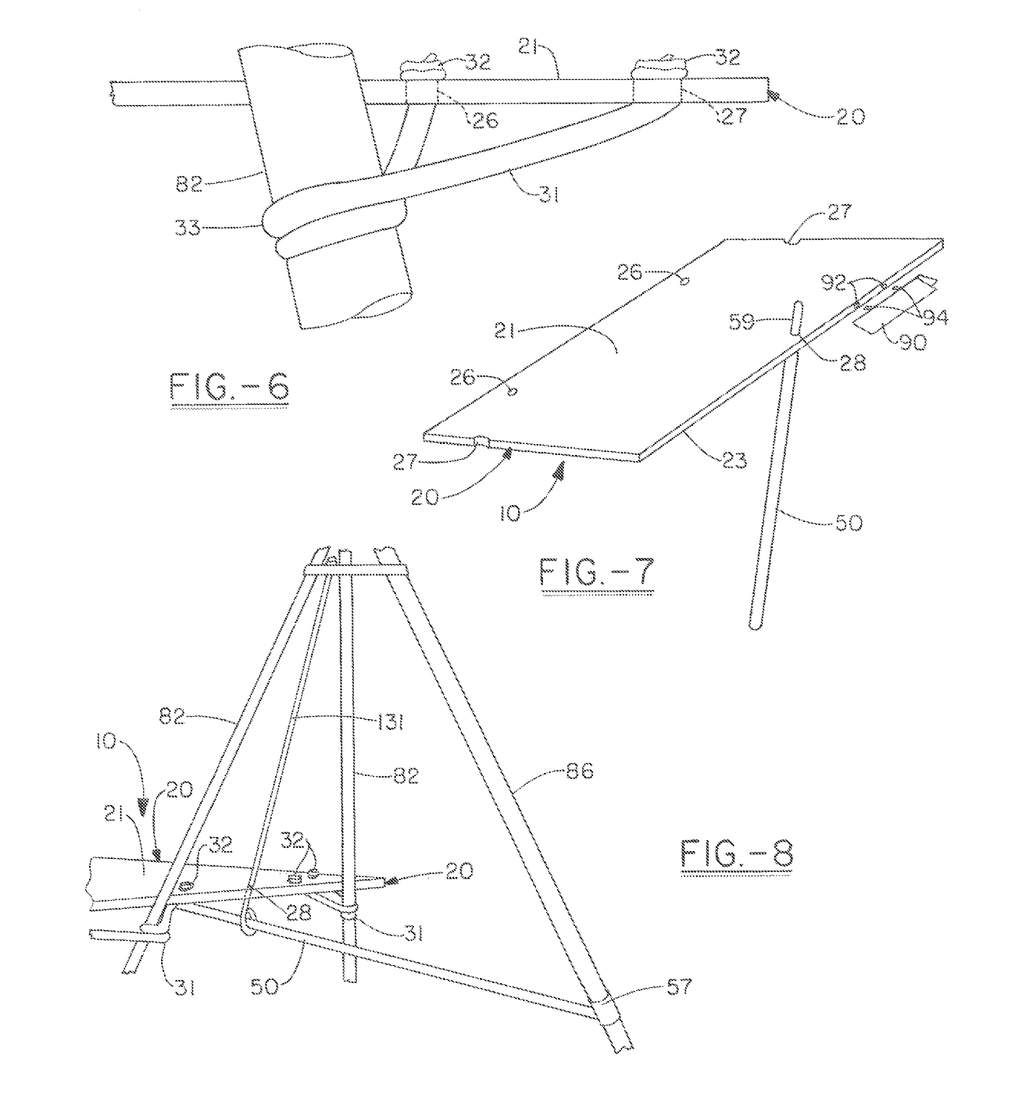
FIG. 6 is a side view illustrating a support leg of a tripod having an attachment element wrapped therearound over a full winding or revolution.
FIG. 7 illustrates a left front perspective view illustrating a support leg including a projection that is extended through an aperture in a distal end of a tray located away from the end of the tray in contact with the tripod.
FIG. 8 illustrates a right rear side view of a further embodiment of the invention illustrating an additional attachment element connected at one end to a portion of the tripod located at a vertical height above the tray and a second end connected to a support leg that is also connected at one end to a rear leg of the tripod, the attachment element extending through an aperture in a portion of the tray adjacent the front legs of the tripod.

In yet a further embodiment, the tray is provided with a wing 90, see FIG. 7 that can be connected and disconnected from the main tray 20 as desired by a user. One or more of each wing 90 and tray may be provided with one or more of a projection 94 and an aperture or recess 92 which allow a wing 90 to be connected to a tray 20, generally at a side surface thereof. Alternatively, each wing and tray can be provided with apertures or holes in which couplers can be inserted in order to connect a wing to a tray. Couplers can be provided in the form of a preferably rigid post or T type connector or post that can be press-fit into apertures in the side surface and throughout, see FIG. 16.

Figure 11:
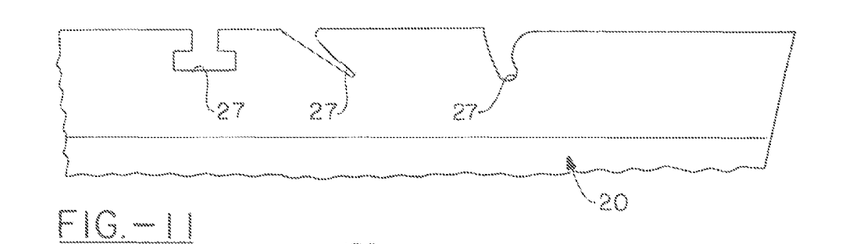
FIG. 11 illustrates further embodiments of various notches for attachment elements & friction points for tensioning conformable fitting.

As described hereinabove, the tray is secured to the fixture or tripod using a securing mechanism 30. In one embodiment, a pressure or compression fit is used to operatively connect the tray to the fixture or tripod. The pressure or compression fit is accomplished, for example by providing a securing mechanism that has an attachment element 31, such as a cord that can be adjustable to apply at least a minimum pressure between a portion of the tripod and the tray in order to prevent downward movement between the tray and portion of the tripod to which the tray is in contact with. Additionally, the attachment element 31 has an adjustable length. For example one or both ends can be shortened from an original length by tying a knot in an end area. For example FIG. 1 illustrates an attachment element 31, in particular a flexible, stretchable cord, e.g. a bungee cord, having a first end 32 connected to the tray 20, at a first location, the cord extending around one leg 82 of the tripod and a second end 32 of the attachment element 31 connected to a second location on the tray 20, spaced apart from the first location. At the first location, the tray includes an aperture 26 through which a portion of the attachment element extends and is operatively connected such that the attachment element cannot be removed from the aperture. At the second location, such as shown in FIG. 2, the tray includes a depression or notch 27 to which the attachment element 31 can be operatively and removably connected whereby pressure prevents the attachment element from being removed from the notch during use. The shape of the notch can vary and can be a slot, L-shaped, T-shaped etc. FIG. 11 illustrates different shapes of notches 27 of tray 20, with a generally T-shaped notch, diagonal notch, and a curved notch being illustrated. The first location and second location on the tray 20 are spaced from each other sufficient distance such that the attachment element 31 in conjunction with the first and second locations provide a desired tension and pressure between the leg of tripod 80 and the tray. Stated in another matter, the tripod leg 82 is pressed or firmly held between a portion of the attachment element 31 and the tray 20. As illustrated in FIG. 1, in a preferred embodiment at least two attachment elements 31 are utilized, each being connected to two different locations on the tripod 80, each to a separate leg 82 thereof.

In one embodiment, such as illustrated in FIG. 6, the attachment element 31 is wrapped around a tripod leg 82 at least one full revolution or at least one complete loop 33. This configuration aids in tightening the attachment element around the leg 82 of tripod 80. Additionally, having at least one loop 33 provides a seat that tray 20 can rest on.

In order to assist in securing the tray 20 to the tripod 80, the tray can additionally be provided with one or more joint segments or pockets 34, such as shown in FIG. 2. The back side surface 24 of the tray preferably includes a plurality of pockets 34 and most preferably at least two for each leg 82 of the tripod 80 to which the tray 20 is to be attached. The shape of each pocket 34 can vary and can have a perimeter that is rounded, angled, or the like or combinations thereof, providing additional friction surface area. The pockets 34 illustrated in FIG. 2 vary in size and are rounded to accommodate a rounded stationary fixture mount. In FIG. 2, three pockets are provided for each leg which allows the tray to be adjusted at three different vertical heights along the axial length of the tripod. The pockets additionally provide for greater surface area contact between the tripod legs and the tray.

Figure 10:
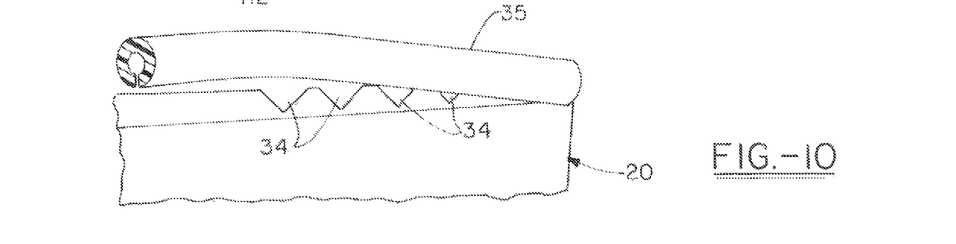
FIG. 10 illustrates a conformable fitting connected to the tray, with a portion of the conformable fitting being removed from the tray to illustrate features, in particular notches or pockets, present in the side surface of the tray.

In yet a further embodiment, the securing mechanism includes a conformable fitting 35, see FIG. 10. In one embodiment, the conformable fitting 35 comprises a piece of resilient material such as a foamed polymer. Preferably the conformable fitting has a high friction surface and can deform between the tray 20 and a leg 82 of the tripod 80. The conformable fitting can be preformed having joint segments or pockets as described hereinabove. In yet other embodiments a conformable fitting can provide a snap-fit to a leg of the tripod. In an embodiment where a snap-fit conformable fitting is utilized, the opening in the fitting is placed adjacent the tripod leg and the tray is pushed against the leg so that the snap-fit conformable fitting engages the tripod leg.

The conformable fitting 35 can be provided in a number of different forms. For example, the conformable fitting can be a generally linearly extending element of a predetermined length connected to the back side 24 surface of the tray as illustrated in FIG. 10. In additional embodiments, a plurality of individual conformable fittings are connected to the back side surface of the tray, wherein a first conformable fitting is spaced a first distance from a second fitting and a second fitting is spaced a second distance from a third fitting. A plurality of conformable fittings can be provided to be used in conjunction with a single tripod leg. Thus, when the tray is operatively connected to two different tripod legs, a plurality of conformable fittings can be provided for each tripod leg.

In still further embodiments, the attachment element 31 can be provided as a cord having an adjustable length, for example due to the presence of a buckle, ratchet mechanism, or the like. In other embodiments, the attachment element can be provided as a cord having an adjustable length due to the presence of a line or cord stop 140, see FIG. 13 for example a push-button operated stop 144 can be utilized in place of or in combination with other features of the attachment element, for example a knot. The cord extends through aperture 142 in the tray 20 and also through aperture 146 in the cord stop 140.

The tray assembly 20 of the present invention is additionally provided with a support leg 50 in various embodiments, see FIG. 1 for example. The support leg has a second end 54 and a second end 54, with the first end adapted to contact a ground surface. The first end 52 is adapted to be placed into contact with or connected, permanently or removably connected, to a portion of tray 20, such as lower surface 22. In various embodiments, the support leg is adjustable in length between the first end and the second end. The length adjustability of the support leg allows the tray to be positioned at the plurality of different vertical heights in relation to the length of the tripod. In one embodiment the support leg comprises a plurality of telescoping segments 55 that can be fixed at different intervals in order to provide length adjustability. In other embodiments the support leg comprises a plurality of threaded segments which can be locked in relation to each other to provide length adjustability.

Preferably, the support leg 50 is provided with a tray mount 56 that is operatively connectable to a surface of the tray 20. In one embodiment, the tray mount 56 comprises a suction cup that is connectable to the bottom surface of the tray such as shown in FIG. 3. Other suitable tray mounts comprise for example Velcro. In other embodiments, such as illustrated in FIG. 7, the support leg 50 is provided with a projection 59 that is adapted to mate with an aperture 28 provided in tray 20.

Figure 4:
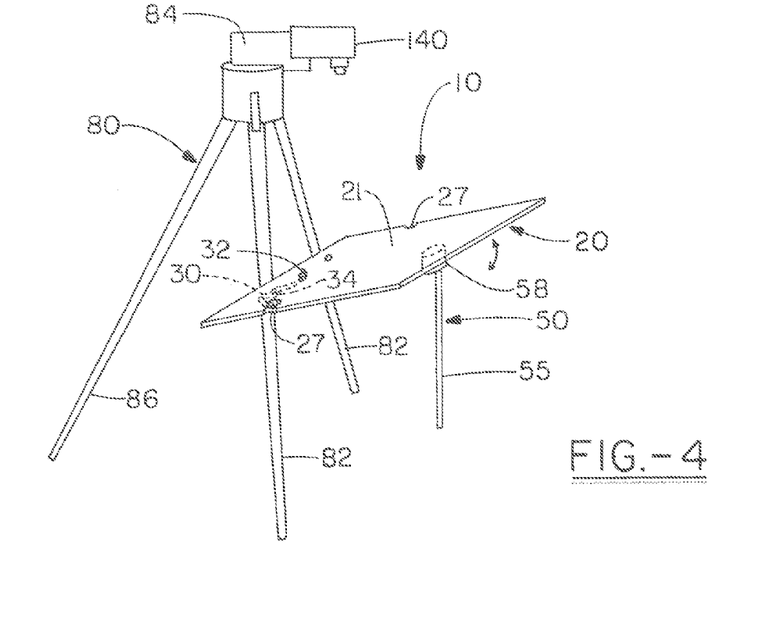
FIG. 4 is a front left perspective view of an embodiment of a tray assembly having a tray connected to a tripod and having a tray plane that is non-horizontal.

In yet a further embodiment of the present invention, the support leg 50 is provided with an angle mount 58, see FIG. 4, preferably at one end of the support leg. The angle mount can be pivoted at an angle greater than 0° to about 90° with respect to a vertical axis. Using an angled amount allows the tray 20, which has a major plane, to be situated at an angle other than horizontal, such as illustrated in FIG. 4. As numerous tripod mounts 84 cannot tilt such that the lens of a camera 140 or other device can be pointed straight down or placed at a horizontal angle and therefore it is desirable to provide the tray with the ability to be positioned with the major plane parallel to the lens of the camera or other device. When the tray plane is not substantially horizontal it is desirable to utilize a non-skid material on the upper surface or any other surface on which objects will be placed.

It is important to note that in some embodiments the support leg may be absent or not necessary as the securing mechanism alone may be utilized to locate the tray at a fixed position in relation to a tripod.

Figure 5:
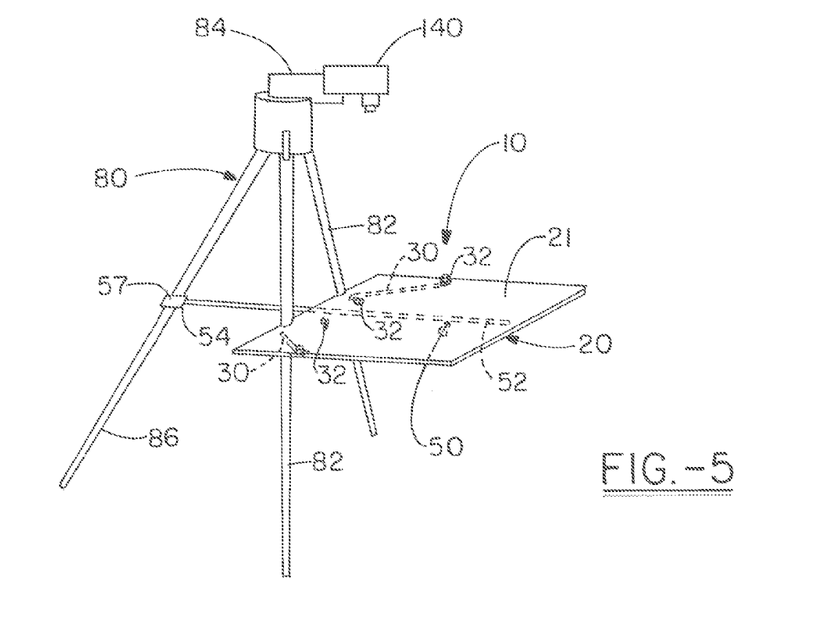
FIG. 5 is a front left perspective view of a tripod assembly having a support leg connected to the tripod and the tray.

In yet a further embodiment, the support leg 50 is connected directly to a leg of the tripod preferably a leg of the tripod 90 that does not contact the tray 20, such as a back leg 86, see FIG. 5. In this embodiment the second end of the support leg is operatively connected to a leg 86 of the tripod utilizing an additional securing mechanism, such as clamp 57. As illustrated in the figure, the support leg 50 runs or extends under a section of the tray 20. The tray is also connected to the tripod leg attachment element 31. Thus, in one embodiment the support leg 50 is free of any connection to a ground surface and yet fully supports tray 20.

In a further embodiment as illustrated in FIG. 8, the support leg 50 is operatively connected to the tripod 80 at least at two locations. One end of the support leg 50 is connected via a clamp 57 to rear leg 86. The other end of the support leg extends underneath tray 20 which is connected via attachment elements 31 to the front legs 82 of the tripod 80. An additional attachment element 131 has a one end connected to a portion of the tripod located above a vertical height of the tray 20. A second end of the attachment element 131 is operatively connected about support leg 50. A portion of the additional attachment element 131 extends through an aperture 28 in tray 20. The further aperture 28 is located on tray 20 away from tripod legs 82, the greater amount of weight the tray 20 can support due to the leverage provided.

Figure 9:
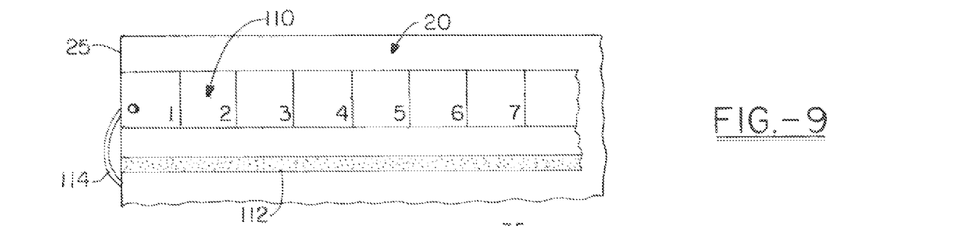
FIG. 9 illustrates one embodiment of a tray accessory, in particular a shelf operatively connectable to the tray.

In order to further increase the versatility of the tray assembly of the present invention, in a further embodiment the tray is provided with a tray accessory 110, such as document holder that can be utilized to secure documents or other objects to the tray, see FIG. 9 for example. In one embodiment the tray accessory comprises a cord 114, which is adjustable in length, such as a bungee cord, that can be operatively connected to tray 20 in order to prevent an object, which can be secured between the cord and the tray, from moving, shifting, or the like. In other embodiments the tray accessory can be provided with a magnetic element 112, see FIG. 9 that allows the tray accessory 110 to be magnetically connected to the upper surface of tray 20.

In yet another embodiment of the present invention, a second tray 120 is provided and is connected to an upper end of the tripod, such as a neck thereof. The lower end of the tray can rest on the first tray or otherwise be suspended from the tripod.

Multiple trays and accessory items can be attached to one another. In primary design, this invention is self-contained, infinitely variable in elevation and angle, relative to its attached rigid fixture.

Figure 12:
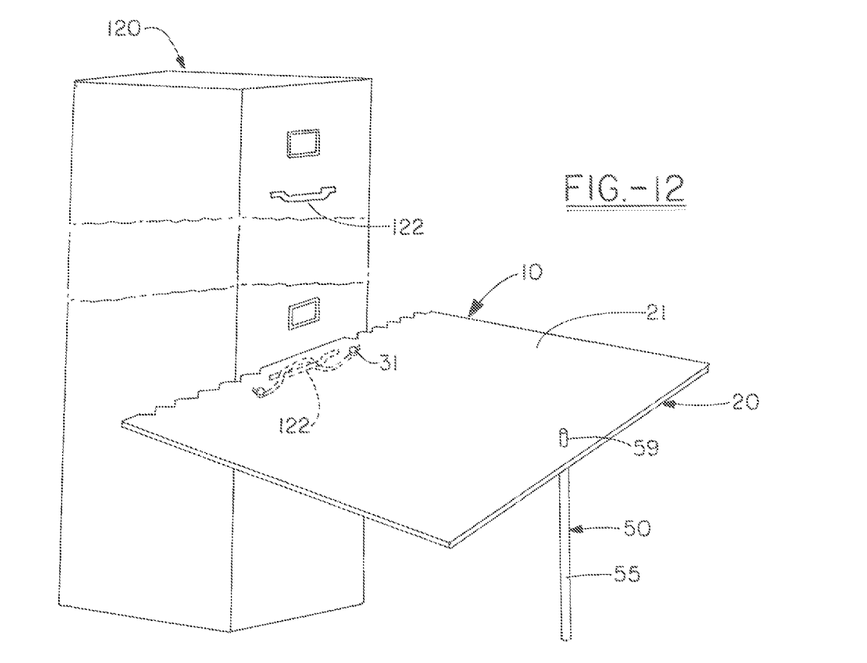
FIG. 12 illustrates a further embodiment of a tray connected to a drawer handle of a filing cabinet, the tray assembly additionally including a support leg.

FIG. 12 illustrates a tray assembly 10 operatively connected to a rigid structure 20, namely a filing cabinet, essentially having a single leg. A lower surface of the tray assembly rests upon a handle 122. A pair of attachment elements 31 are operatively connected about the handle to connect the tray 20 to the rigid structure 120. A support leg 50 provides additional support for the tray in FIG. 12.

Figure 13:
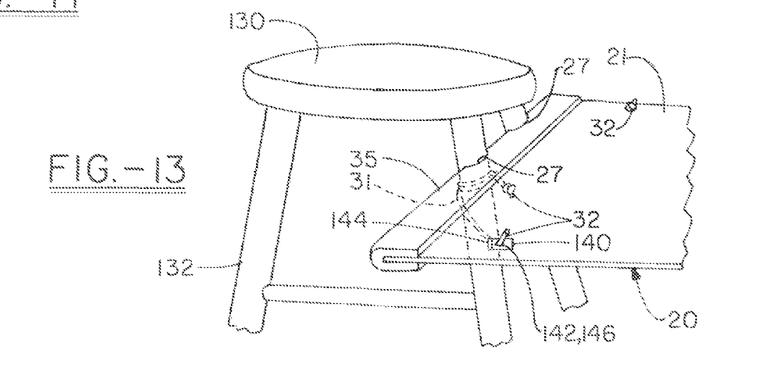
FIG. 13 is a left side perspective view illustrating one embodiment of a tray assembly connected to legs of a stool.
Figure 14:
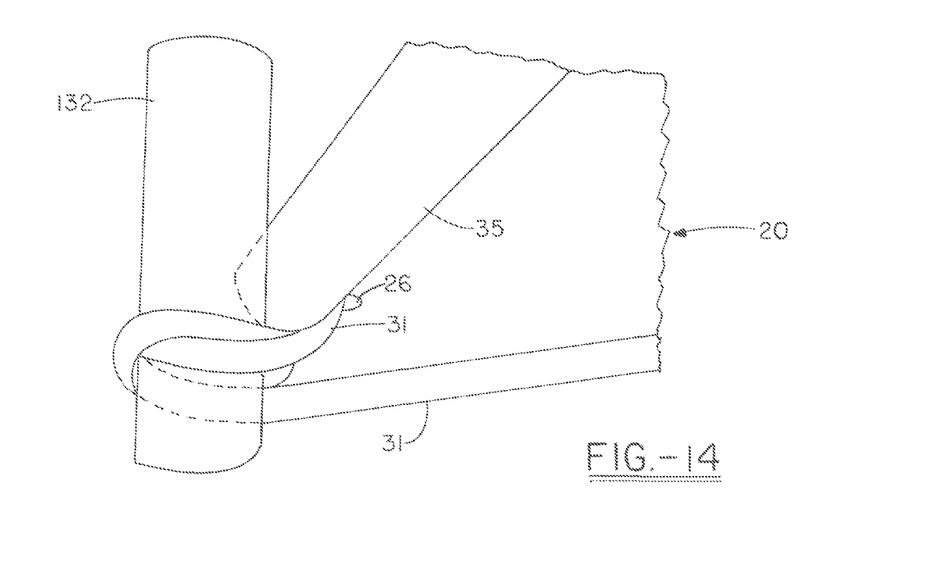
FIG. 14 is a close-up perspective view of the embodiment of FIG. 13 illustrating the operative connection between the tray including a conformable fitting as well as an attachment element.

FIGS. 13 and 14 illustrate a further embodiment of the present invention wherein tray assembly 10 is operatively connected to the legs 132 of a stool 130. FIG. 14 shows a close-up view of an attachment element 31 connecting tray 20 to leg 132.

Figure 15:
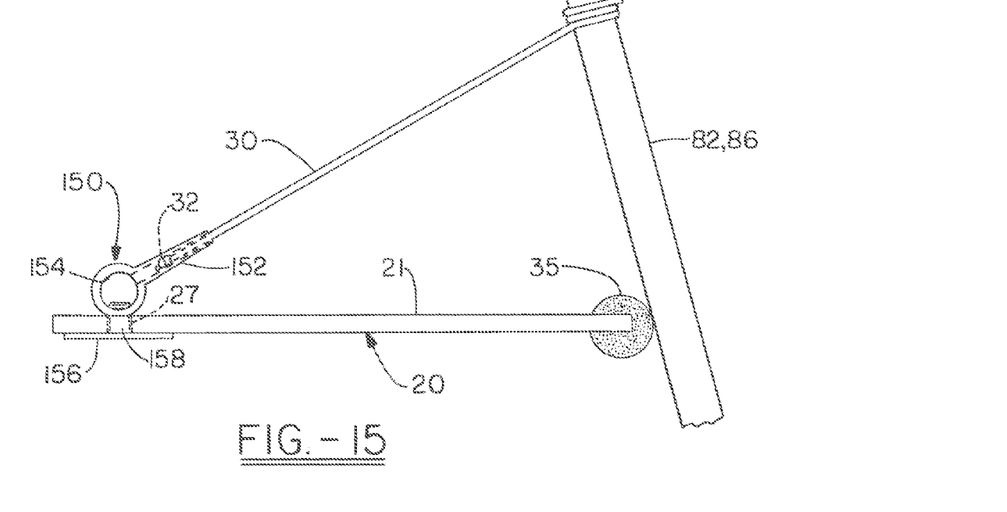
FIG. 15 illustrates a side view of one embodiment of a tray assembly of the present invention including a connector operatively connected to a tray and an attachment element for supporting the tray.
Figure 16:
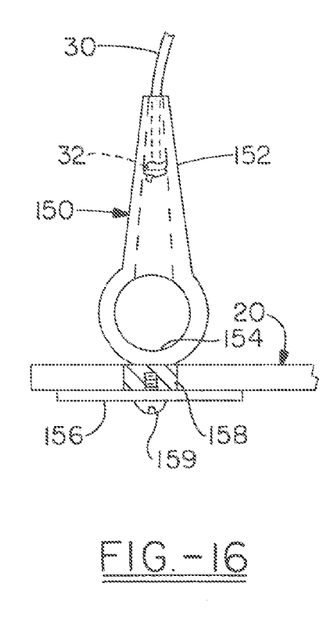
FIG. 16 illustrates an embodiment of a suitable connector for use in conjunction with the present invention.
Figure 17:
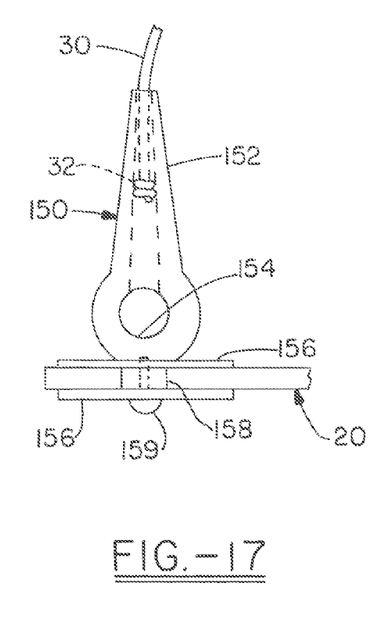
FIG. 17 illustrates a further embodiment of a suitable connector for use in connection with the present invention.

FIGS. 15 through 17 illustrate embodiments of connectors also suitable for use in conjunction with the present invention. In FIG. 15 connector 150 includes a body 154 having a threaded shank 158 that can be operatively connected to base 156 with a portion of tray 20 being located therebetween. The shank 158 can be inserted through an aperture, or a notch 27 to provide a removably fixed connection between connector 150 and tray 20. The connector 150 includes a slot 152 through which a portion of the securing mechanism can be extended as the slot 152 has a variable width. The attachment element is bound with the connector when the width of the slot is narrower than the width of the securing mechanism. The body 154 can be fixed or disposed at a variable angle in relation to shank 158. FIG. 16 illustrates an embodiment where base 156 is connected to shank 158 utilizing a fastener 159. In this view, the securing mechanism is illustrated connected at a mid portion of slot 152. FIG. 17 utilizes a pair of bases 56 disposed on either side of tray 20 with a shank located therebetween. The assembly is connected by fastener 159.

While in accordance with the patent statutes, the best mode and preferred embodiment have been set forth, the scope of the invention is not limited thereto, but rather by the scope of the attached claims.

What is claimed is:

1. A tray assembly for a device comprising a single or multi-legged device, or a rigid structure, the tray assembly comprising:
    a tray having an upper surface, a lower surface, a back side, a front side, and two ends;
    a securing mechanism including first and second attachment elements each comprising an adjustable length cord; and
    wherein the tray includes a conformable fitting that can deform between the tray and a leg of the device and is adapted to accommodate the leg of the device, the conformable fitting comprising a resilient material, and a plurality of pockets adapted to accept a leg of the device, wherein the tray further includes i) an aperture and ii) a notch for each securing mechanism present, and wherein the first and second attachment elements are adapted for operatively connecting the tray to the single or multi-legged device, or a rigid structure whereby the tray is supported thereby, and wherein the first attachment element is operatively connectable to both the aperture and the notch in order to operatively connect the tray to the single or multi-legged device or a rigid structure.

2. The tray assembly according to claim 1, wherein the first and second attachment elements are each adapted to be wrapped around the leg of the device and each form at least one complete loop in order to provide connection between the tray and the device.

3. The tray assembly according to claim 1, wherein the tray assembly further includes a support leg having a first end and a second end, with one of the ends in contact with the tray.

4. The tray assembly according to claim 3, wherein one of the ends of the support leg includes a tray mount or a projection enabling connection to the tray, wherein when the projection is present, the tray includes an additional aperture through which the projection can extend, and wherein the support leg is adjustably extendable in length.

5. The tray assembly according to claim 1, wherein the tray assembly further includes a support leg having a first end adapted to contact the lower surface of the tray and a second end including a clamp adapted to be connected to a different leg of the tripod or multi-legged device.

6. The tray assembly according to claim 5, wherein a third attachment element is present and has a first end operatively connected to the support leg and a second end adapted to be connected to a portion of the device located above the tray.

7. The tray assembly according to claim 1, wherein the pockets are located in the back side of the tray, and wherein the notch for each securing mechanism present is located in each end of the tray, and wherein each aperture is located inward from at least one of the pockets measured with respect to the ends of the tray.

8. The tray assembly according to claim 1, wherein the tray further includes a support leg having a first end and a second end, with one of the ends in contact with the tray.

9. A tray assembly that can be secured to a device comprising a single leg, tripod, multi-legged device or a rigid structure at a plurality of different vertical heights, the tray assembly comprising:
    a tray comprising a major tray plane having an upper surface and a lower surface, the tray plane bounded by a back side, a front side and two ends, wherein the tray can be secured to the device such that the major tray plane is located at a plurality of different angles with respect to a vertical plane; and
    a securing mechanism having at least two length-adjustable attachment elements for providing at least a minimum amount of tension to maintain the tray in a desired position in relation to the device, wherein each of the attachment elements of the securing mechanism is connected to the tray at different locations, each via at least one aperture and at least one notch of the tray and also adapted to contact the device, wherein each of the notches is located in an end of the tray and each of the apertures extends between the upper surface and lower surface of the tray and is located between the ends of the tray, and wherein each of the at least two attachment elements is adapted to be wrapped around a leg of the device and form at least one complete loop with one end of the attachment element connected to the tray aperture and another end connected to the tray notch in order to provide connection between the tray and the device.

10. The tray assembly according to claim 9, wherein the back side of the tray includes a plurality of pockets adapted to accept a leg of the device.

11. The tray assembly according to claim 9, wherein the tray assembly further includes a conformable fitting connected to the tray and having a high friction surface that can deform between the tray and a leg of the device.

12. The tray assembly according to claim 9, wherein the tray assembly further includes a support leg having a first end and a second end, with one of the ends in contact with the tray.

13. The tray assembly according to claim 12, wherein one of the ends of the support leg includes a tray mount or a projection enabling connection to the tray, wherein when the projection is present, the tray includes an additional aperture through which the projection can extend, and wherein the support leg is adjustably extendable in length.

14. The tray assembly according to claim 9, wherein the tray assembly further includes a support leg having a first end adapted to contact the lower surface of the tray and a second end including a clamp adapted to be connected to a leg of the device.

15. The tray assembly according to claim 14, wherein a third attachment element is present and has a first end operatively connected to the support leg and a second end adapted to be connected to a portion of the device located above the tray.

16. The tray assembly according to claim 9, wherein the notch is a slot, has a L-shape, T-shape or is a curved notch.

17. A tray assembly for a device comprising a single or multi-legged device, or a rigid structure, the tray assembly comprising:
   a tray having an upper surface, a lower surface, a back side, a front side, and two ends;
   a securing mechanism including first and second attachment elements each comprising an adjustable length cord; and
   wherein the tray includes one or more of a) a plurality of pockets adapted to accept a leg of the device and b) a conformable fitting adapted to accommodate a leg of the device, wherein the tray further includes one or more of i) an aperture and ii) a notch for each securing mechanism present, and wherein the first and second attachment elements are adapted for operatively connecting the tray to the tripod, multi-legged device, or a rigid structure whereby the tray is supported thereby, wherein the tray assembly further includes a support leg having a first end adapted to contact a lower surface of the tray and a second end including a clamp adapted to be connected to a leg of the single or multi-legged device, wherein a third attachment element is present and has a first end operatively connected to the support leg and a second end adapted to be connected to a portion of the device located above the tray.

18. The tray assembly according to claim 17, wherein the pockets are located in the back side of the tray, and wherein the notch for each securing mechanism present is located in each end of the tray, and wherein each aperture is located inward from at least one of the pockets measured with respect to the ends of the tray.

* * * * *